Figure 1:
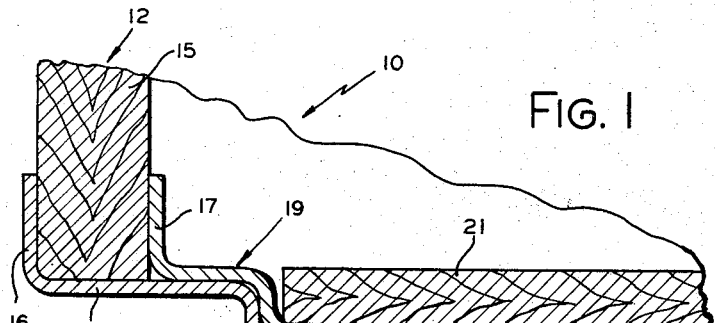

Sept. 1, 1959 R. LAPSLEY 2,902,246
CLAMPING DEVICE
Filed Dec. 23, 1955

INVENTOR.
ROBERT LAPSLEY
BY
ATTY.

United States Patent Office 2,902,246
Patented Sept. 1, 1959

2,902,246

CLAMPING DEVICE

Robert Lapsley, Buchanan, Mich., assignor to Clark Equipment Company, a corporation of Michigan Application December 23, 1955, Serial No. 555,140

3 Claims. (Cl. 248—361)

The present invention relates generally to freight handling means and devices in which a portable freight carrier is associated and disassociated with freight transporting devices. Particularly, the present invention concerns an improved clamping means for fixing such a portable freight carrier to the supporting surface provided by a freight transporting device, such as a ship or like vessel.

Generally, the present invention relates to the portable freight handling and transporting devices and systems set forth in the copending application Serial No. 577,118, filed April 9, 1956, in the name of Jack E. Loomis and entitled "Freight Handling Means and Method," and which application is a continuation-in-part of application Serial No. 531,489, filed August 30, 1955, now abandoned. Further, the present invention comprises an improvement over the later filed application Serial No. 555,025, filed on December 23, 1955, in the name of Jack E. Loomis and Dale W. McKee, entitled "Clamping Means." The above applications are commonly owned by the assignee of the instant application.

In brief, the present invention is directed to an improved means for clamping, latching or otherwise affixing a portable freight carrier to the supporting surface provided by the deck of a ship. In general, the portable freight carrier may be thought of as a supporting base structure carrying a suitable receptacle for the storage and transportation of articles of freight. Normally, such a portable freight carrier is lifted and deposited or otherwise transported from a loading dock or like location to the decking of the ship as by a crane hoist or other suitable material handling equipment.

The present invention comprises a suitable clamp member pivotally mounted adjacent an opening in a supporting deck of a ship so that the same may be selectively moved to a projecting position above said deck for engaging a bearing surface on a portable freight carrier deposited thereover. Suitable guide means are embodied in conjunction with the clamp member for protecting and housing the clamp member and for guiding the portable freight carrier into a desired position whereat the same may be effectively engaged and held by the clamping device of this invention. An improved locking device is included for maintaining the clamp in its engaged condition with the freight carrier and additional means are provided for disengaging the locking device whereby the clamp may be released preparatory to the latter's removal from the freight transporting device.

The main object of my invention is to provide a new and improved clamping device for securing a portable freight carrier to the supporting surface of a freight transporting device, as for example to the decking of a ship.

A further object of this invention is to provide a new and improved manually operable clamping device for locking a portable freight carrier to a supporting surface of a freight transporting device.

A still additional object of this invention is to provide a new and improved clamping device, as aforementioned, in which improved means are embodied for maintaining such clamping device in a locked condition with respect to a portable freight carrier means.

Another object of this invention is to provide a new and improved clamping device for the purpose and uses as aforementioned, in which an improved locking mechanism is embodied, accessible for operation from beneath the supporting surface of a freight transporting device.

A still further object of this invention is to provide a new and improved clamping device for the uses and purposes aforesaid, in which a locking device is embodied to provide improved features of operation and function whereby the clamp member of my clamping device may be readily positioned to engage and hold a portable freight carrier on the supporting surface of a freight transporting device with maximum operational convenience.

The above and further objects, features and advantages of this invention will appear to those familiar with the art from the following detailed description and specification of a preferred embodiment of its concepts found in the accompanying drawings.

Figure 2:
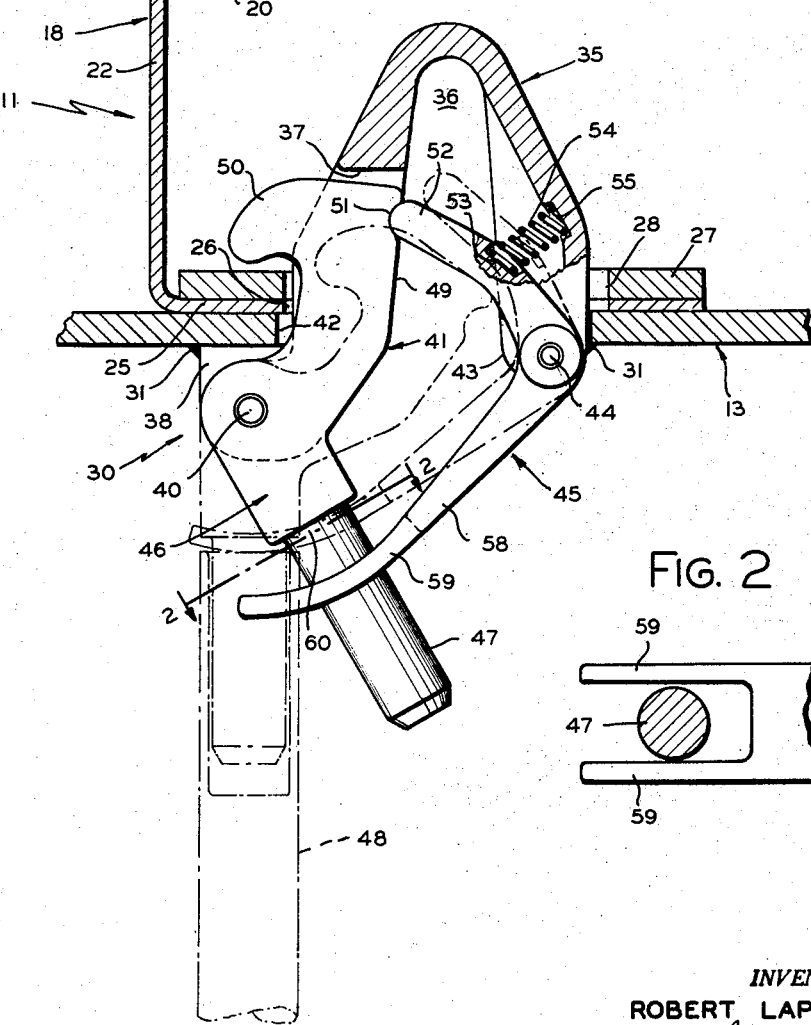

In the drawings:

Figure 1 is a partial cross-sectional view with parts therein shown in full elevation illustrating the elements and their organization in the improved clamping device of this invention; and Figure 2 is a cross-sectional showing taken substantially at line 2—2 of Figure 1 and looking in the direction of the arrows.

As shown best in Figure 1, a portable freight carrier, indicated generally by numeral 10, includes a base structure 11 which supports a freight receptive body, shown partially in this figure and indicated generally by numeral 12. This particular type of freight carrier includes ear members adjacent its upper end which are designed to be engaged by harness means associated with a crane hoist (not shown) whereby the same may be deposited on the deck 13 of a ship or similar freight transporting means.

It will be understood that the structure of the freight carrier 10 includes side walls 15 which form the enclosure or body portion 12 thereof, the lower ends of such walls being received in reinforced channels formulated by spaced wall portions 16 and 17 of frame or rail members 18 and a floor supporting plate 19, respectively. The rails 18 and floor support plate 19 are preferably welded or otherwise rigidly affixed to one another according to the fabricated assembly illustrated in cross-section Figure 1. The supporting plate 19 is further angularly offset to present, in addition to the upwardly extending wall portion 17, a horizontal platform portion 20 which carries suitable decking or flooring 21 comprising the interior bottom of the freight carrier 10. Such extending platform portion 20 is disposed inwardly of the rail or frame member 18 and is related substantially transversely to the plane of the upright web wall 22 on such rail. Walls 22 and 16 of the frame member 18 are interconnected by a transversely related wall or platform section 23 which extends beneath the carrier wall 15 between the lower end of the upright wall portion 16 and the upper end of the main web portion 22 of the frame member 18.

While the cross-sectional showing in Figure 1 illustrates only a portion of the freight carrier, it will be understood, as is more fully set out in the above referred to application, Serial No. 531,489, that the base structure 11 comprises a substantially rectangular assembly including parallel end frame and interconnecting transversely extending side frame members 18.

The lower end of the wall portion 22 is suitably turned inwardly to parallel the platform portion 20 of the floor supporting plate 19 thereby to present and define a lower platform portion 25. The platform portion 25 is provided with an enlarged opening 26 and such serves as an immediate support for an overlying superimposed bearing plate 27. Bearing plate 27, like the platform portion 25, bears an enlarged opening 28 which is registeringly aligned with the opening 26 in operation.

When the freight carrier 10 is deposited on the supporting decking 13 of the vessel, a pair of improved clamping devices 30 of this invention project upwardly from the plane of such decking to enter correspondingly arranged pairs of spaced openings 26 and 28 to secure opposite sides of the base structure 11. Therefore, each carrier means so deposited on the deck of the ship or vessel will be gripped by at least two of the improved clamping devices 30 of this invention.

The decking 13 of the ship is supported according to familiar ship-building practice and a between deck spacing is available beneath decking 13 for the successful operation of my improved clamping device; such device being supported directly in the decking 13 of the vessel and secured thereto as by welds 31 or like fastening expedients.

It will be recognized also that generally, several improved sets of clamping means 30 of this invention may be associated with the decking 13 of the vessel in a manner to engage the base structure of plural freight carriers deposited on the deck. Such pairs of devices 30 serve to guide the carriers into position and engage the base structure thereon to clamp the same securely to the supporting decking of the vessel.

Turning now to the particulars of the improved clamping device of my invention, it will be seen that such includes a guide means 35 formed as a substantially dome or pyramid-shaped casting having a hollow interior defining a chamber 36, which is entered at one side by a lateral opening 37 extending inwardly from the exterior of the casting and reaching upwardly a suitable distance above the plane of the bearing plate 27. The casting 35 further includes a pair of downwardly projecting or extending ear portions 38 which are spaced apart and extend outwardly beneath the chamber 36 substantially along opposite sides of the opening 37 to provide bearing support for a substantially horizontal axle 40 on which a substantially C-shaped clamp member 41 is mounted for limited arcuate movement. It will be noted further that the casting 35 sits within and extends through an opening 42 formed in the decking 13 of the vessel and that the ear portions 38 thereon extend beneath such decking beyond the periphery of opening 42 whereat they are connected as by the welds 31. Thus secured to the decking 13, the major portion of the casting 35 projects upwardly from the upper face or supporting surface thereof to present a substantially pyramid-shaped guide or pilot means for receiving and properly aligning the bearing plate openings 28 of the freight carrier so that such plate is in position to be engaged by the clamp member 41, as will be described presently. The casting 35 further includes a second set of ear portions 43 which are formed on the opposite side thereof from the ear portion 38 and are aligned substantially opposite the lateral opening 37. Such ears 43, like ears 38, are spaced apart and support a horizontal axle 44 therebetween for mounting a pivotally movable latching member or locking device 45.

The improved clamp 41 of my invention, as stated, is pivotally supported on the axle 40 carried by the casting 35 and such clamp member includes a first depending arm portion 46 bearing a cylindrical extension 47 which is coaxially receptive of an operating handle 48 comprising, for example, a length of steel pipe.

A second arm portion 49 of the clamp member 41 extends upwardly from the pivotal axle 40 to invade the hollow interior or dome-like chamber 36 in the casting 35. Such arm portion 49 includes a laterally extending clamping lip 50 which is designed to overreach the bearing plate 27 and extend through the opening 37 in the one side of the casting 35 when the clamp member 41 is pivotally moved to its full line position, as shown in Figure 1 of the drawings. In such full line position, the clamping member 41 is located to prevent the passage of the bearing plate and thus the removal of the freight carrier from the freight transporting device.

It will be noted, in particular, that the arm portion 49 of the clamp member 41 is equipped with a suitable detent recess 51 adjacent its upper or outer end and substantially opposite the extending lip portion 50. Such detent recess is designed for engagement by a first arm portion 52 of the latching device 45, thereby to prevent clockwise rotation of the clamp 41. The arm portion 52 of the latching device is further equipped with a recess socket 53 substantially midway of its length for receiving one end of a compression coil spring 54 which is mounted between such arm 52 and the inside face of the casting 35; the same being piloted in said side wall of the casting as by recess means 55 formed therein. Spring 54 normally urges arm portion 52 into locking engagement with the recess 51. A second arm portion 58 is formed on the latching member 45 at approximate right angles to arm portion 52 so that in effect, the latching member 45 comprises a bell crank linkage, as shown best in Figure 2. The arm portion 58 is bifurcated adjacent its outer end to present a pair of spaced fingers 59, 59 which extend along opposite sides of the cylindrical extension 47 of the first arm portion 46 on the clamp member. Such fingers 59 are suitably curved or turned upwardly and are of such a length as to constantly embrace the cylindrical portion 47 of the clamp member.

It will be recognized further that in the operative position of the clamp member 41, as shown in Figure 1, the disposition of the fingers 59 is in spaced relation with an enlarged cylindrical shoulder 60 presented at the intersection of the first arm portion 46 and the extending cylindrical portion 47 of the clamp member. This spacing permits limited pivoting of the latching member 45 about its pivot axle 44 so that the same may be moved abuttingly against the shoulder portion 60, as shown by the dotted lines in Figure 1. The rocking activity of the latch member in this manner serves to compress spring 54 and release the first finger portion 52 thereon from the detent recess 51 of the clamp member. In this manner, the clamp 41 is released from a locked condition and thereby provides for the retraction of the extending clamp lip portion 50 from an overlying or engaging condition with respect to the bearing plate 27.

Particularly, the releasing operation of the latching device 45 is effected simply by sliding the tubular operating handle 48 onto the cylindrical extension 47 of the clamp member and shoving the same upwardly to bias the finger portions 59 of the latch member into abutting engagement with the shoulder stop 60 on the clamp member. This compresses spring 54 and withdraws finger 52 from recess 51.

It is believed that from the foregoing description of the elements and operation of my improved clamping device, those familiar with the art will readily recognize and appreciate its improved features and concepts. It is further to be understood that while various changes, modifications and substitutions of equivalents may be made in the particular embodiment of my invention herein described and shown, nevertheless such alterations will not necessarily depart from the spirit and scope of my invention. As a consequence, it is not my intention to be limited to the specific form of my invention herein described and shown except as may appear in the following appended claims.

I claim:

1. A clamping device of the class described for securing a plate member to a supporting surface, the plate member having an opening formed therethrough, comprising in combination, a hollow guide member extending upwardly from the supporting surface and presenting an exterior guide surface for piloting the guide member into the opening in the plate member, said guide member having a lateral opening formed in one side thereof, a clamp member pivotally mounted within the hollow of said guide member opposite said lateral opening, a detent recess formed in said clamp member, a spring biased latch member pivoted adjacent said clamp member and movable to engage and disengage said recess, an operating handle accessible beneath said plate member for pivoting said clamp member to an operating position wherein it extends through said lateral opening and projects outwardly of said guide member to interferingly overhang the plate member, said latch member when engaged with said recess serving to lock said clamp member in its said operating position to prevent disengagement of said plate and guide members, and means interlocking said handle and latch member to insure disengagement of said latch member from said recess conditional to pivoting said clamp member.

2. A clamping device of the class described for use in locking a portable freight carrier to the supporting surface of a freight transporting device, the carrier having a bearing plate provided with an opening, comprising, a dome-shaped guide member mounted on the transporting device and projecting upwardly from the supporting surface thereon for insertion into and through the opening in the bearing plate, said guide member having a lateral opening communicating with an internal chamber thereof, a clamp member pivotally mounted on said guide member and having a first arm portion extending into said chamber, a second arm portion on said clamp member depending from said chamber, an operating handle adapted to be detachably mounted on said second arm portion and manually operable from beneath the supporting surface of the transporting device to pivot said clamp member, movement of said operating handle in one direction serving to pivot said clamp member appropriately to move its said first arm portion outwardly through said lateral opening to an interfering position preventing movement of said guide member through the opening in said bearing plate, and spring biased latch means engageable with said first arm portion in response to detaching said operating handle from said second arm portion, thereby to lock said first arm portion in its said interfering position.

3. The combination of claim 2 in which said first arm portion is formed with a detent recess and said latch means comprises a bell crank linkage having one arm engageable with said detent recess and resiliently held therein by spring means, a second arm of said bell crank linkage being bifurcated adjacent its outer end to embrace the said second arm portion of said clamp member, said second arm being engaged by said handle when the latter is mounted on said clamp member and pivotally moved thereby to withdraw the said one arm from said recess, releasing said clamp member for pivotal movement.

References Cited in the file of this patent

UNITED STATES PATENTS

| | | |
|---|---|---|
| 917,379 | Tayntor | Apr. 6, 1909 |
| 1,355,925 | Stone | Oct. 19, 1920 |
| 2,031,302 | Clark | Feb. 18, 1936 |
| 2,128,005 | Lombard | Aug. 23, 1938 |
| 2,273,854 | Fitch | Feb. 24, 1942 |
| 2,381,633 | Young | Aug. 7, 1945 |
| 2,424,429 | Bamberg | July 22, 1947 |
| 2,426,498 | Franklin | Aug. 26, 1947 |
| 2,427,603 | Higgins | Sept. 16, 1947 |